Nov. 20, 1956     C. GOURDOU     2,771,594
PASS-SIGNAL DEVICE FOR ROAD VEHICLES
Filed Jan. 8, 1952     2 Sheets-Sheet 1
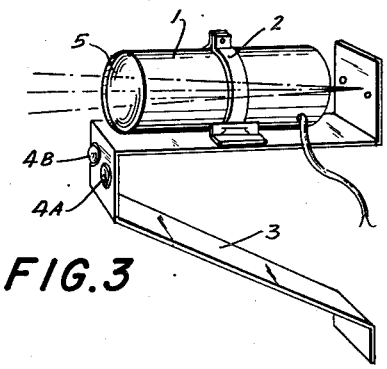
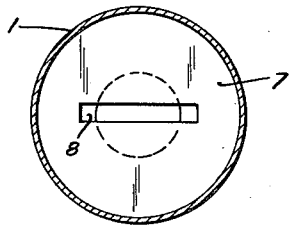
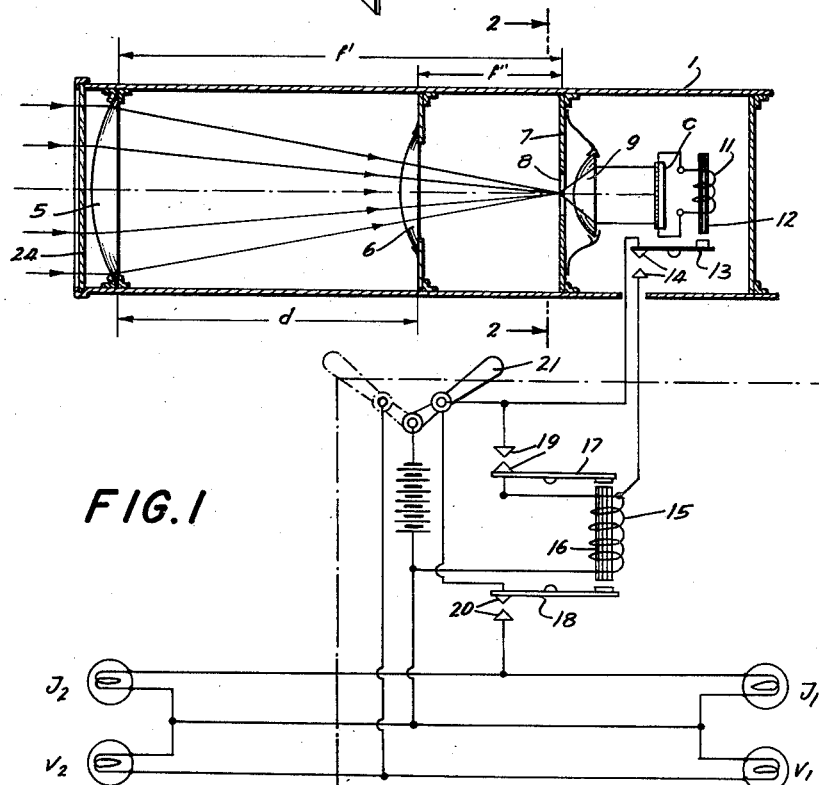
INVENTOR:
Charles Gourdou
BY: Michael S. Striker
agt.

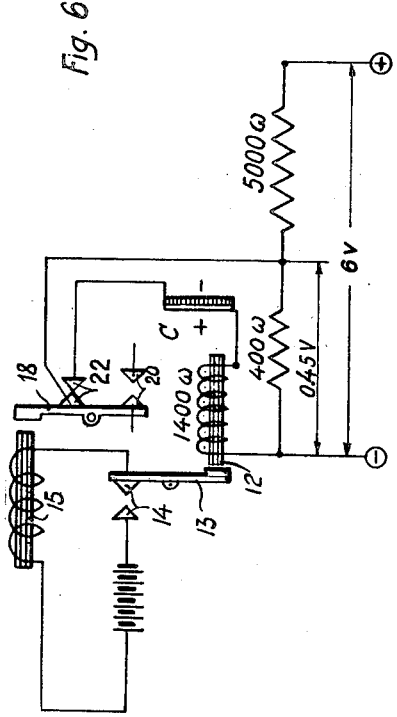
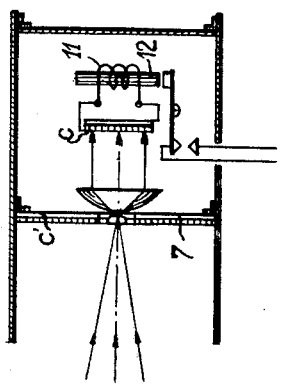
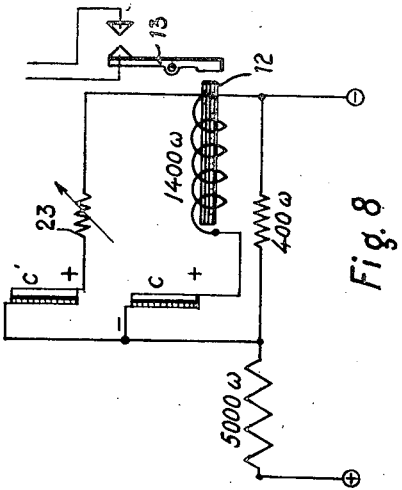
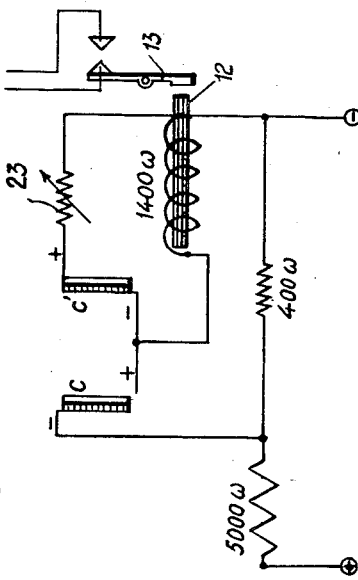

United States Patent Office 2,771,594
Patented Nov. 20, 1956

2,771,594

PASS-SIGNAL DEVICE FOR ROAD VEHICLES

Charles Gourdou, St. Mande, France, assignor to Avertisseurs Routiers Silencieux, Paris, France, a company of France Application January 8, 1952, Serial No. 265,498

Claims priority, application France March 1, 1951

8 Claims. (Cl. 340—34)

This invention relates to road vehicle pass-signal devices to be used particularly for day-traffic of the type comprising a signal actuated from a photo-cell receiver in response to a light flash from the head-lamps of a vehicle running behind.

Such devices have the drawback of being responsive, not only to the light beam from the emitting head-lamps, but also to parasitic radiations from ambient sources such as day-light, sunlit objects, and so on.

The suppression of this drawback gives rise to following difficulties:

To protect the cell against parasitic radiations a small diaphragm should be interposed therebefore. The horizontal size of said diaphragm however should be sufficient to pick up the light emitted from the vehicle running behind, whatever the lateral position of said vehicle on the road.

To avoid the use of expensive electric or electronic amplifiers the cell should give a sufficient output to operate directly electromagnetic relays. For this purpose, a sufficient quantity of useful light should be picked up and the same should be projected uniformly on substantially the whole sensitive area of the cell.

None of the existing devices has succeeded in overcoming these difficulties.

Some of them make use of a convergent optical system concentrating the useful light on the cell. If the diaphragm is interposed in the converging beam, it is necessarily too large to protect the cell efficiently against the parasitic radiations. If the diaphragm is located in the focal plane of the system and the cell arranged immediately behind, it only receives a spot of light and is not sufficiently energized. If the cell is arranged in the diverging beam at a sufficient distance behind the focus to be fully illuminated, the distribution of the light on the cell is not uniform.

An object of the invention is to provide a pass-signal receiver of the type referred to in which a wide portion of the useful beam is picked up and first focussed on a diaphragm by a convergent optical system and then uniformly distributed on the photo-electric cell or cells arranged at a desired distance behind said diaphragm by a small lens disposed against said diaphragm.

Another object of the invention is to interpose on the path of the incoming light a yellow filter so as to favor yellow light against radiations of other colors.

A further object of the invention is to complete the signal device by repetition tail-lights adapted to indicate to the driver of the emitting vehicle if the driver of the vehicle to be passed has received the warning signal and whether he agrees to be overtaken or not.

Other objects will become apparent from the following description of the device according to the invention taken in conjunction with the drawings in which like references indicate like parts and in which:

Fig. 1 is a diagrammatical view of a pass-signal device according to the invention.

Fig. 2 is a detail view of the diaphragm of said device.

Fig. 3 shows an elastic support for mounting the device at the rear of a motor-car.

Fig. 4 shows diagrammatically the operation of the pass-signal device on a vehicle.

Fig. 5 shows an alternative embodiment in which an additional compensating photo-electric cell is provided.

Figs. 6 to 8 are wiring diagrams of the photo-electric cell or cells, Fig. 6 further showing a device enabling the primary relay to release in spite of the remaining current due to the bias.

The optical system and the photo-electric cell of the pass-signal device according to the invention are mounted in a tubular casing 1 constituting a self-contained unit to be secured at the rear of the vehicle substantially at a level corresponding to the usual level of the head-lamps on any vehicle.

In Fig. 3, casing 1 is supported through a strap 2 by a slightly elastic metal sheet bracket 3, so that the field of the optical system moves under the action of the vibration due to the vehicle motions and scans a spatial zone wider than the optical system field.

In the example shown, the bracket 3 also carries tail-lamps 4a, 4b which are provided to indicate to the driver of the emitting vehicle if the driver of the receiving vehicle has been warned and if he wishes to be passed or not.

As shown in Fig. 1, the optical system of the device comprises a large converging lens 5 the optical axis of which coincides with the axis of the tubular casing 1 and a second smaller converging lens 6, the focal length $f''$ of lens 6 and the combined focal length $f'$ of the two lenses, and the relative arrangement of said lenses being such that lens 6 compensates for the optical aberrations of lens 5, which permits obtaining in the focal plane of the system a reproduction of the image picked up by the lens which is as punctiform as possible. Furthermore, a partition 7 in which is provided a rectangular opening 8 is interposed in said focal plane, the height of said opening being sufficiently reduced to eliminate substantially the action of ambient light while its length is sufficient to keep continuously within said diaphragm the image of the head-lamps of a vehicle running behind, whichever may be the lateral position of said vehicle within predetermined limits.

It will be easily understood that the elastic support of casing 1 described above with reference to Fig. 3 permits further reducing the vertical side of the diaphragm field due to the scanning ensured by the vibrations resulting from the motion of the vehicle.

In the example shown a yellow filter 24 is interposed in the incoming path of the light rays, said filter favoring the yellow light of the head lamp P against other radiations. Behind opening 8 and adjacent thereto is provided a small convergent lens 9 the function of which is to project the image formed in the diaphragm plane on the whole sensitive surface of a photo-electric cell C.

The output of cell C energizes the winding 11 of a primary relay 12, the armature 13 of which closes, when said winding is energized, a contact 14 mounted in the operating circuit 15 of a secondary relay 16.

In the example shown, the secondary relay 16 is provided with two armatures 17 and 18; armature 17 closes, when winding 15 is energized, a contact 19 mounted in the holding circuit of relay 16.

The other armature 18 closes, when winding 15 is energized, a contact 20 mounted in the feeding circuit of two yellow lamps J1 and J2, one of which J1 is located on the instrument board of the vehicle while the other J2 is located, e. g. at 4A (Fig. 3). The operating and holding circuits of relay 16 and the feeding circuit of lamps J2 are completed in parallel through the contacts of a reversing switch 21 in the position thereof shown in full line in Fig. 1.

In the other position, shown in dot-dash line in Fig. 1 of the reversing switch 21 the operating and holding circuits of relay 16 and the feeding circuit of the yellow lamps J1 and J2 are cut off while a feeding circuit for two green lamps V1 and V2 is completed, lamp V1 being located on the instrument board and lamp V2 being located, e. g. at 4B (see Fig. 3).

The operation of the device is as follows:

When a vehicle S wishes to overtake a vehicle A equipped with a pass-signal device according to the invention, the driver of said vehicle S switches on headlamps P and the light beam emitted by said lamp impinges, through the optical system described above, upon the photo-electric cell C, the same then sending a current pulse to the primary relay, and thence to the secondary relay. The latter operates and its armatures 17 and 18 complete the feeding circuit of the yellow lamps J1 and J2, on the one hand, and the holding circuit of said secondary relay. The yellow lamps thus remain illuminated, even if the output pulse from the photo-electric cell is very short, as long as the reversing switch 21 is not operated.

The driver of vehicle A is warned by the illumination of the yellow lamp J1 that vehicle S wishes to overtake him. On the other hand, the illumination of the tail yellow lamp J2 indicates to the driver of vehicle S that the driver of vehicle A has been warned. When the driver of vehicle A is ready to be overtaken, he has only to operate the reversing switch 21 so as to black-out the yellow lamps, while illuminating the green lamps, of which the rear one V2 indicates to the driver of vehicle S that he may now pass, after which the driver of vehicle A brings back his reversing switch into the position shown in full line in Fig. 1, so that the device is ready to receive other warning signals from other vehicles running behind. The sensitivity of the receiver may be varied by means of a set of yellow filters and by adjusting the primary relay. The photo-electric cell C is preferably a barrier-layer cell. This type of cell permits to obtain an optimum output, for the available values of illumination, by causing the cell to generate a current most equal to the short-circuiting current. This is obtained by building up at the terminals of the circuit comprising the cell and the primary relay, a suitable potential corresponding to a current lower than the short-circuiting current although sufficient to operate the relay.

In Fig. 5 is shown an additional photo-electric cell C' also preferably of the barrier-layer type adapted to correct the action of cell C and to further eliminate the parasitic action of ambient lights so as to avoid substantially any untimely operation of the device.

In the example shown, the correcting cell C' is mounted in the focal plane of lens 5 in place of the partition 7 and the opening 8 is directly cut out in said cell. Thus, when the image of the emitting head-lamps is formed exactly on this diaphragm, as shown in the drawing, the cell C' is irradiated only by the ambient light, while cell C is irradiated both by the head-lamp light and by the ambient light. It will be easily understood that, if cell C' is so mounted as to counteract the action of cell C, when both cells receive only ambient light, the action of cell C will be substantially suppressed, while when both cells receive the light from the head-lamps and from ambient sources, the action of cell C will be substantially reduced to the value corresponding to the light of said head-lamps alone.

Practically, it is clear that such theoretical results are never perfectly obtained. Nevertheless, the presence of a correcting cell C' suitably protected by a filter permits, by a suitable selection of the area of said cell, the cross-section of said filter and its distance from said cell to eliminate substantially the whole parasitic action of ambient lights.

In Fig. 6 is shown, as an illustration, a wiring diagram of a biased cell C. It is also possible, however, to avoid such a bias as in the example shown in Fig. 1, by providing ultra-sensitive relays.

In the example shown in Fig. 6, the bias is ensured by a 400 ohms resistor shunting both the cell and the 1400 ohms winding of the primary relay. This whole assembly is fed from a 6 volts battery through a 5000 ohms step-down resistor, so that when the cell is in darkness, the bias is weak. Now, if the feeding circuit of the cell and primary relay remained continuously completed, as in the embodiment of Fig. 1, the resulting 0.45 voltage fed to the terminals of the cell in order to substantially suppress the action of the primary winding resistance, would prevent, when the cell is irradiated, said relay from releasing.

To permit resetting the device, there is interposed in the circuit of cell C, as shown in Fig. 6, a contact 22 controlled by the armature 18 of the secondary relay, said contact being closed at rest, as shown in Fig. 6, so as to permit the operation of the primary relay. As soon as the secondary relay is in turn operated, contact 22 is opened, while contact 20 interposed in the feeding circuit of the yellow lamps (see Fig. 1) is closed. The opening of contact 22 cuts off the operating circuit of the primary relay which is thus capable of releasing. The armature 18 of the secondary relay is held, as previously, until the driver acts upon the reversing switch 21, when the secondary relay releases, so that its armature 18 closes contact 22 again, which permits any subsequent operation of the primary relay and so on.

In Figs. 7 and 8 are shown two alternative wiring diagrams in which two photo-electric cells C and C' are mounted differentially as in Fig. 5 and biased as in Fig. 6.

It is clear that, in the case of Figs. 7 and 8, a device similar to that of Fig. 6 will be adopted to make the primary relay capable of releasing.

A variable resistor 23 (Figs. 6 and 7) is interposed in the circuit of the correcting cell to permit adjusting the correcting action of said cell.

Although certain embodiments of the invention have been described above, it is apparent that modifications may be made without departing from the spirit and scope thereof as set forth in the appended claims.

What is claimed is:

1. In a light signal responsive signalling system for vehicles, a receiver device, comprising, in combination, an elongated casing open at one end thereof; convergent lens means mounted in said opening; a photo electric cell located in said casing at the other end thereof; a partition in said casing located intermediate said lens means and said photo electric cell and formed with a rectangular horizontal slot located in the focal point of said lens means; and a convergent lens mounted between said partition and said photo-electric cell and adapted to project light rays passing through said slot on substantially the entire light sensitive surface of said photo electric cell while extraneous light is blocked by said partition.

2. In a light signal responsive signalling system for vehicles, a receiver device, comprising, in combination, an elongated casing open at one end thereof; convergent lens means mounted in said opening; a photo electric cell located in said casing at the other end thereof; a partition in said casing located intermediate said lens means and said photo electric cell and formed with a rectangular horizontal slot located in the focal point of said lens means; a convergent lens mounted between said partition and said photo-electric cell and adapted to project light rays passing through said slot on substantially the entire light sensitive surface of said photo electric cell while extraneous light is blocked by said partition; and at least one optical filter mounted in said casing for altering the relative intensity of the component rays of light passing through said lens means.

3. In a light signal responsive signalling system for vehicles, a receiver device, comprising, in combination, an elongated casing open at one end thereof; convergent lens means mounted in said opening; a first photo electric cell located in said casing at the other end thereof; a second photo electric cell transversely extending through said casing and constituting a partition located intermediate said lens means and said first photo electric cell and formed with an aperture located in the focal point of said lens means; and a convergent lens mounted between said partition and said first photo-electric cell and adapted to project light rays passing through said aperture on substantially the entire light sensitive surface of said first photo electric cell while extraneous light passing through said lens means reaches said first and second photo electric cells; and circuit means connecting said first and second photo electric cells for compensating the energizing influence of extraneous light on said first and second photo electric cells.

4. In a light signal responsive signalling system for vehicles, a receiver device, comprising, in combination, an elongated casing open at one end thereof; convergent lens means mounted in said opening; a first photo electric cell located in said casing at the other end thereof; a second photo electric cell transversely extending through said casing and constituting a partition located intermediate said lens means and said first photo electric cell and formed with a rectangular horizontal slot located in the focal point of said lens means; a convergent lens mounted between said second photo electric cell and said first photo-electric cell and adapted to project light rays passing through said slot on substantially the entire light sensitive surface of said first photo electric cell; and at least one optical filter mounted in said casing for altering the relative intensity of the component rays of light passing through said lens means.

5. In a light signal responsive signalling system for vehicles, a receiver device, comprising, in combination, an elongated casing open at one end thereof; convergent lens means mounted in said opening; a photo conductive cell of the barrier layer type located in said casing at the other end thereof; a partition in said casing located intermediate said lens means and said photo conductive cell and formed with a rectangular horizontal slot located in the focal point of said lens means; and a convergent lens mounted between said partition and said photo conductive cell and adapted to project light rays passing through said slot on substantially the entire light sensitive surface of said photo conductive cell while extraneous light is blocked by said partition.

6. In a light signal responsive signalling system for vehicles, a photo-electric receiver device comprising a casing having a first convergent circular lens mounted in an opening at one end and a photoconductive cell of the barrier-layer type at the other end, an opaque partition intermediate said first lens and said cell provided with a rectangular horizontal slot having a length adapted to permit passing of light rays emitted by a pair of spaced head lights of a vehicle and having passed through said first lens, said first lens being adapted to converge the rays from the source of said light signal to a focus point lying in the plane of said slot, a lens between said first lens and said partition to compensate for optical aberrations of said first lens, a second convergent lens interposed between said partition and said cell and adapted to project the rays passing said focus point within said slot over substantially the whole area of the light sensitive surface of said cell, and at least one optical filter mounted in said casing for altering the relative intensity of the component rays of light received or transmitted by said first lens, said photo-conductive cell being adapted to actuate a signal controlling relay.

7. In a light signal responsive signalling system for vehicles, a photo-electric receiver device comprising a casing having a convergent circular lens mounted in an opening at one end and a first photoconductive cell of the barrier-layer type at the other end, a second photoconductive cell of the barrier layer type mounted between said lens and said first cell so as to form an opaque partition therebetween, said second cell being provided with a rectangular horizontal slot and said lens being adapted to converge the rays from the source of said light signal to a focus point lying in the plane of said slot, and a second convergent lens interposed between said partition and said first cell to project the rays passing said focus point within said slot over substantially the whole area of the light sensitive surface of said first cell, a first electric circuit connected to said first cell and a relay actuated thereby upon reception of said light signal, a second electric circuit a variable resistance, said second circuit being connected to said second cell and connected to said first circuit in such a manner that said second cell will attenuate the energy of the relay actuating current in said first circuit in accordance with the intensity of extraneous light transmitted to said second cell and in accordance with the adjusted value of said resistance, said relay being adapted to control signalling means.

8. In a light signal responsive signalling system for vehicles, a photo-electric receiver device comprising a casing having a first convergent circular lens mounted in an opening at one end and a first photo-conductive cell of the barrier-layer type at the other end, a second photo-conductive cell of the barrier-layer type mounted in said casing so as to form an opaque partition between said lens and said first cell, said partition being provided with a rectangular horizontal slot and said lens being adapted to converge the rays from the source of said light signal to a focus point lying in the plane of said slot, a lens between said first lens and said partition to compensate for optical aberrations of said first lens, a second convergent lens interposed between said partition and said first cell and adapted to project the rays passing said focus point within said slot over substantially the whole area of the light sensitive surface of said first cell, and at least one optical filter mounted in said casing for altering the relative intensity of the component rays of light received or transmitted by said first lens, a first electric circuit connected to said first cell and a relay actuated thereby upon reception of said light signal, a second electric circuit connected to said second cell and a variable resistance, said second circuit being connected to said first circuit in such a manner that the energy of the current generated by said second cell will attenuate the energy of the relay actuating current in said first circuit in accordance with the intensity of extraneous light transmitted to said second cell and in accordance with the adjusted value of said resistance, said relay being adapted to control signalling means.

References Cited in the file of this patent

UNITED STATES PATENTS

| | | |
|---|---|---|
| 2,258,355 | Douglass | Oct. 7, 1941 |
| 2,431,575 | McCune | Nov. 25, 1947 |
| 2,557,314 | Robison et al. | June 19, 1951 |
| 2,578,347 | Gagnaire | Dec. 11, 1951 |
| 2,675,488 | Bickley | Apr. 13, 1954 |

FOREIGN PATENTS

| | | |
|---|---|---|
| 663,504 | Great Britain | Dec. 19, 1951 |
| 419,803 | Great Britain | Sept. 20, 1933 |
| 432,865 | Great Britain | Apr. 30, 1934 |
| 458,786 | Great Britain | Dec. 28, 1936 |
| 773,874 | France | Nov. 27, 1934 |